May 19, 1959  C. LANGBERG  2,887,424
MANUFACTURE OF PHOTOGRAPHIC FILTERS
Filed July 11, 1956
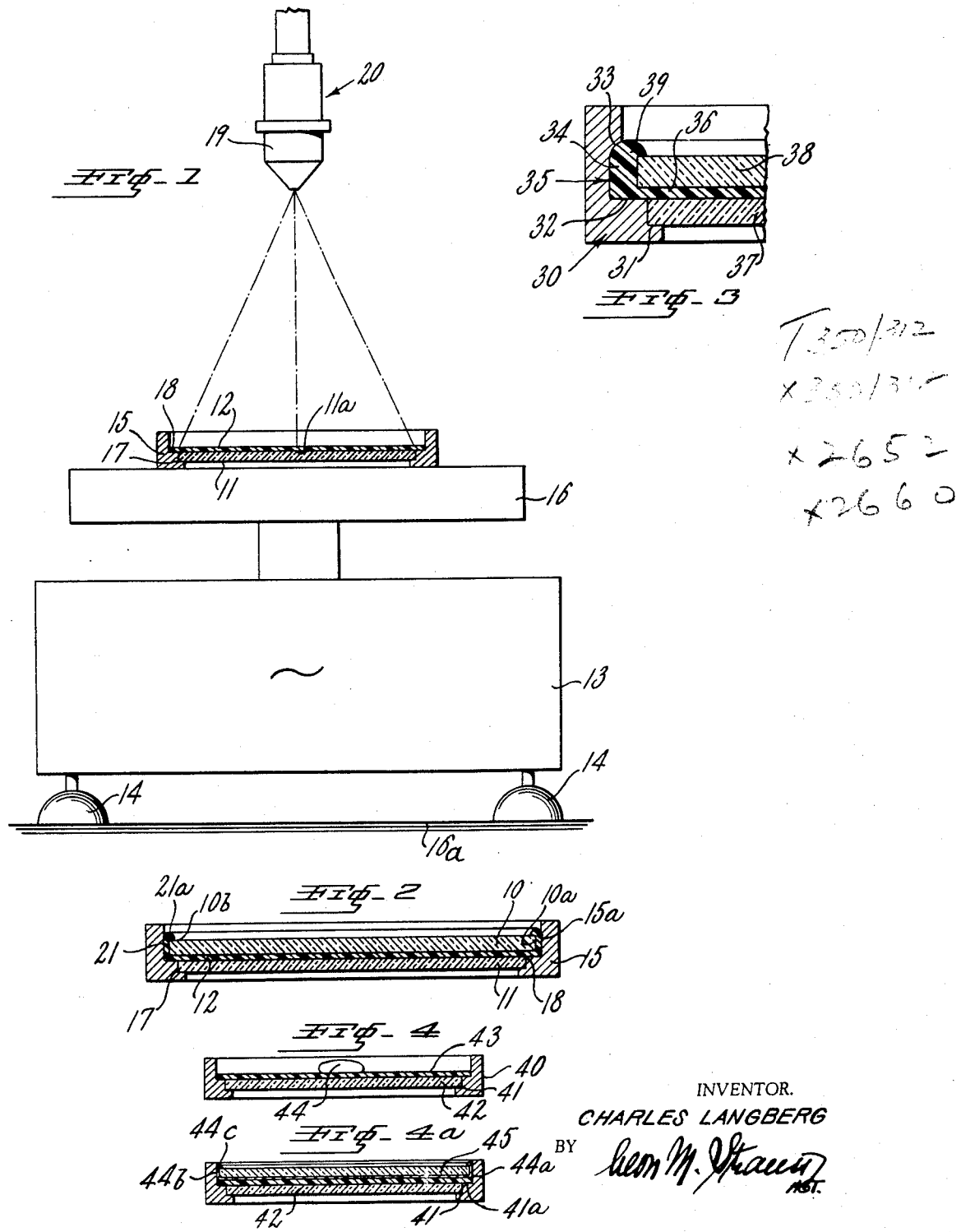
INVENTOR.
CHARLES LANGBERG

United States Patent Office 2,887,424
Patented May 19, 1959

2,887,424

MANUFACTURE OF PHOTOGRAPHIC FILTERS

Charles Langberg, Bronx, N.Y., assignor to Instrument Glass Co. Inc., Brooklyn, N.Y.

Application July 11, 1956, Serial No. 597,270

10 Claims. (Cl. 154—2.65)

This invention relates to the production of color filters, and in particular to laminated color filters for use in optical instruments.

It is an important object of the present invention to provide means considerably simplifying and reducing the cost of production of laminated color filters to a minimum, said filters being usable for a variety of optical apparatus, employed in photography, television, color lighting and the like.

It is another object of the present invention to provide means contributing to the formation of laminated color filters in a novel and highly efficacious manner, enabling the mold or mount employed to retain the filter laminae during bonding of the latter to constitute an integral part of the finished filter.

Still another object of the invention is the provision of means conducive to a substantial reduction of waste and cost of both materials and labor in the production of color filters of the aforesaid type, as well as to a distinct increase in efficiency and economy of production together with improvements of the optical characteristics of such filters.

As a corollary of the foregoing, it is also an object of the present invention to provide means affording a highly efficacious and thoroughly reliable process of forming laminated color filters, judicious use being made, in the practice of such process, of vibratory forces to ensure uniformity of distribution of cementing or bonding material over the entire surfaces of the filter laminae to be united to each other.

A further object of the invention is, therefore, the provision of means leading to a compact, high quality color filter unit which is inexpensive and easy to manufacture and substantially free of bubbles and other faults tending to cause interference with or distortion of light passing through the filter.

Yet another object of the invention is the provision of means enabling a filter unit of the aforesaid type in which a single charge or spray of filter producing material is employed to constitute not only the cementing layer between the filter laminae, but also a complementary cement mass ensuring concurrent bonding of the cemented laminae to the holder or mount therefor.

Still another object of the invention is directed to provide means ensuring the manufacture of light filters and their assembly through mass production methods, whereby after-treatment may be substantially completely eliminated and unskilled labor employed which was heretofore not possible.

These and other objects of the invention will become further apparent from the following detailed description, reference being made to the accompanying drawing showing preferred embodiments of the invention.

In the drawing:

Fig. 1 illustrates diagrammatically and partly in section an apparatus for the production of color filters according to the invention.

Fig. 2 is an enlarged sectional view of a color filter with its mount made in accordance with the invention.

Fig. 3 is a fragmentary sectional view of a color filter with its mount shown in modified form and embodying the invention.

Fig. 4 is a sectional view of a color filter in a further modified form, shown prior to the application of the top glass plate thereto.

Fig. 4a is a sectional view of the color filter of Fig. 4 as a complete laminated product.

Referring now more particularly to the drawing there is disclosed an apparatus for manufacturing color filters consisting principally of carrier plates or glass disks 10, 11 between which the color filter layer 12 is sandwiched and simultaneously retained in mount or holder 15, which also forms the mold for producing the filter proper.

The color filter layer according to the invention is subjected to the action of a vibrator 13 of known construction, which is supported on feet 14 placed on a base 16a. On top of vibrator 13 there is disposed a free-swinging platform 16.

On platform 16 there is retained preferably under suction means (not shown) filter mount or holder 15 which has the inner annular stepped shoulders 17 and 18.

On shoulder 17 is supported glass disk 11 to which through the nozzle 19 of a spray gun 20 a suitable filter composition 12 in layer formation is applied. This filter layer 12 is then subjected to the influence of vibrations, whereby the layer or coating is uniformly distributed over the surface of the plate or disk 11, the upper surface 11a being substantially flush with the shoulder 18 of the mount or holder 15.

In contradistinction to known processes the filter layer according to the invention is retained on the glass disk and within the mount forming the mold for the layer. Considerable waste of time and material is avoided which was heretofore encountered as it was always difficult to control a uniform and particular color density required, to do away with disturbances caused by dust particles, bubbles, ripples, etc. as mostly only certain sections of the laminated color filter was actually usable. Known methods proposed to coat one of two large glass sheets with a layer of a plasticizer having incorporated therein a dyestuff, whereby centrifugal forces act on the layer while the glass sheet is located in a so-called whirler apparatus. Only those sections of the laminated sheets having the layer therebetween which were usable were cut into circular disks, thereafter inserted into metal mounts, and then cemented therein or retained in position through pressure exerted by suitable retaining rings. According to the prior art it was therefore difficult to manufacture an inexpensive complete filter unit requiring substantially unskilled labor and avoiding waste in materials.

In accordance with the invention, after layer 12 has been evenly distributed through vibrations and spraying action as a layer of sufficient quantity beyond that finally required, the layer which contains a suitable dyestuff is sandwiched between disks 10 and 11. Before the upper disk 10 is applied to the layer or coating the latter is permitted to dry until the solvent contained therein has completely evaporated. The upper glass plate 10 is then placed onto the layer and both glass plates 10 and 11 are uniformly pressed thereagainst. Heat is applied to said layer through said glass plates at a temperature of about 100° to 110° C., the pressure being approximately 15 to 20 lbs. per square inch and maintained for about two hours. Any surplus portion of the layer 21 extends upwardly between the inner surface 15a of the mount or holder and the adjacent surface 10a of the upper glass plate 10 and forms an upper rim-like annular portion 21a which overlies the top end 10b of glass plate 10 and thus bonds same to the mount and layer.

The vibrations exerted by vibrator 13 occur in horizontal or vertical directions. Mount or holder 15 is preferably made from aluminum or other metal material, such as brass or steel, if the filter layer material has bonding properties in regard to such metal.

Aluminum is, however, preferred, having suitable porous surface for ensuring strong bond with the layer or coating material. The layer 12 has a thickness of about .002 to .004 of one inch.

Referring now in particular to Fig. 3 there is shown a mount or holder 30 having annular shoulders 31 and 32, the latter being provided with an upright and undercut inner recess 33 forming a pocket 35 for excess material 34 which constitutes a part of the layer 36. Circular glass plate 37 rests on shoulder 31 while upper glass disk 38 is held above layer 36 and reaches somewhat into the pocket 35, whereby said excess material 34 forms a rim 39 of a thickness above .001 of one inch. In the example shown in Fig. 3 the glass disk 38 may be somewhat larger in diameter and heavier than the glass disk 37, as shown.

The steps of carrying out the process are succinctly the following:

Glass plate 11 is placed onto the annular shoulder 17 after being previously thoroughly cleaned in any known way. Thereafter colored filter layer 12 is spread on the top surface 11a so as to form thereon a substantially heavy coating of uniform thickness which spreads out evenly over said surface 11a and toward the adjacent flush annular rim surface 18.

As a suitable layer composition may be employed:

50% by weight of vinyl resin compound consisting of
  Vinylite resin solution MA 28–18 Blend #513 made by Bakelite Corp., Div. of Carbon and Carbide Corp.
5% by weight of dibutylphthalate, as plasticizer
45% by weight of ethyl acetate as solvent The aforesaid composition has a sufficient syrupy viscosity to be fed through the nozzle 19 of spread gun 20.

Ethyl acetate acts as a solvent and thinner, may be colored or clear, and may contain a dyestuff (ink) in powder form of about 4 grams, while the remainder of the solvent amounts to about 100 grams. Ethyl acetate is first filtered through paper before it is added to the aforesaid layer composition, the latter being filtered through paper before being spread.

The surface layer material is oozed out beyond the outer edge 10a of glass disk 10 and rises within the space between the respective inner surfaces 15a and 10a of the mount 15 and glass disk 10. Thus the latter glass disk will be permanently centered in position while the filter layer is displaced and shaped to the desired thickness within the mount or holder 15 in which it remains.

The aforesaid filter-glass-disk-mount assembly has been found in practice to give very good results and has shown that it may be readily freed from all air bubbles, solvent vapors and undesirable ripples due to applied vibrations, the coating or layer 12 after having been permitted to dry is substantially of uniform thickness and completely free from any deficiencies. The filter and mold (mount) or holder form finally the commercial laminated filter product.

Figs. 4 and 4a illustrate respective steps in the production of a somewhat modified color filter assembly made in accordance with the invention.

Mount or holder 40 has stepped shoulders 41 and 41a. On shoulder 41 is placed a glass disk 42 on the top surface of which is spread an even layer 43 of a composition hereinabove referred to. This layer 43 extends to the shoulder 41a flush with the aforesaid glass disk top surface and is treated in a manner, as hereinabove explained by means of vibrations and is then permitted to set and dry. In the center of layer 43 is then placed a blob of a binder substance 44 which also forms a plasticizer and on the latter is then centered in a known manner (not shown) the upper glass disk 45, whereby the blob of binder 44 under ensuing pressure is reduced to a skin coating 44a which rises laterally within the space between glass disk 45 and adjacent inner surface of mount or holder 40 at 44b and overlies in a rim-like manner at 44c a peripheral edge of the top surface of glass plate 45.

The above mentioned binder or cement substance 44 which provides a smooth optical finish and contributes to the adhesion of the aforesaid layer 43 to the second or upper glass disk 45 may consist of triethylene glycol D 1-2 ethylbutyrate, of which only a blob or drop is placed in the center of the above layer 43 after the latter has been sufficiently dried. This binder substance is a non-solvent and will not attack the aforesaid layer 43 nor its characteristics.

After the binder has been applied (Fig. 4) glass disk or plate 45 is placed onto the same and pressure is applied to ensure securing glass disk 45 to the mount 15 and layer 43. A relatively reduced heat of about 60° to 70° C. is also applied to process the binder substance, while 43 presents the required thickness for the final filter stratum.

It can thus be seen that there has been provided according to the invention a process of producing a filter for use in connection with photographic purposes comprising the steps of placing first a glass disk in a mold-forming mount or holder having an inner supporting surface for said glass disk, applying a viscous filter layer to the upper surface of said first glass disk in a quantity in excess of that required for the final filter stratum, subjecting said layer on said first glass disk to vibrations to thereby free said layer from air bubbles, ripples and like irregularities and to thereby displace said layer beyond the upper surface of said first glass disk for contact with the adjacent inner supporting surface of the mount or holder.

The layer is then subjected to a drying action and a second glass disk is placed in said mount or holder for support by said inner surface and for contact with said dried layer to thereby sandwich said layer between both said glass disks.

Finally sufficient pressure and heat are applied through said glass disks to said layer, to thereby soften the latter and to spread and uniformly distribute same between said glass disks and to force excess portion of said layer between said second glass disk and said inner mount or holder surface. Thus, said second glass disk is bonded through said excess layer portion to said adjacent inner mount or holder surface, thereby finally adjusting the thickness of said layer to that of the required filter stratum.

The second glass disk may be adjusted in position relative to the mount and first glass disk on the aforesaid layer through known centering means or pins, when said glass disk is inserted in said mount by suction-controlled feeding means (not shown).

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The process of producing a filter in situ for use in connection with photographic and like purposes comprising the steps of inserting into a mold forming mount provided with a stepped inner surface a first glass plate, then applying a viscous colored filter layer to the upper surface of said glass plate in a quantity corresponding to the final filter stratum, subjecting said layer on said first glass plate to vibrations to thereby free said layer from air bubbles, ripples and like irregularities and to thereby spread said layer beyond the upper surface of the first glass plate for contact with the adjacent step of said inner mount surface, adding to said layer a plasticizer substance capable of producing a clear and smooth optical finish on said layer, inserting into said mount a second glass plate for contact with said substance, to thereby sandwich said layer and said substance between said glass plates, exerting pressure to said glass plates and said substance, to thereby force the latter to spread beyond and above said second glass plate, and finally applying heat sufficient to bond said second glass plate to said inner mount surface and said layer, thereby forming a unitary assemblage in which said mount forms the mold, as well as the housing for the filter for ready use in connection with photographic and like optical purposes.

2. The process of producing an optical filter in a mold-forming mount, which has two stepped annular inner shoulders for spacedly supporting two glass disks; comprising the steps of inserting on one shoulder of said mount one of said glass disks, then applying a viscous filter layer in a quantity exceeding that required for the final filter to the upper surface of said one glass disk, subjecting said layer on said one glass disk to vibrations to thereby free said layer from air bubbles, ripples and the like and to cause spreading of said layer beyond the surface of said one glass disk for contact with the adjacent other shoulder of said mount, placing the other glass disk onto said dried layer, and finally applying heat and pressure to said layer through said glass disks, to thereby force said layer to spread beyond and above said other glass disk, whereby said other glass disk is bonded through displaced excess layer to said adjacent other shoulder of said mount to form a unitary assemblage in which said mount forms the mold, as well as the housing for the filter for ready use in connection with photographic and like optical purposes.

3. The process of producing a filter stratum for use in connection with photographic purposes in a mold-forming mount having an inner surface provided with shoulders for spacedly supporting two glass disks; the steps of applying a viscous filter layer to the upper surface of the lowermost glass disk, subjecting said layer on the surface of said lowermost glass disk to vibrations to thereby free said layer from air bubbles, ripples and like irregularities and to thereby uniformly distribute said layer on the upper surface of said lowermost glass disk, then subjecting said layer to drying action, depositing on said dried layer a non-solvent, cementitious substance, placing into said mount the uppermost glass disk for contact with said substance and said dried layer to thereby sandwich said layer between both said glass disks, and finally applying heat and pressure through said glass disks to displace said substance past said uppermost glass disk and to dry said substance, whereby said uppermost glass disk is bonded through said displaced substance to said adjacent inner mount surface, thereby forming a unitary assemblage in which said mount forms the mold, as well as the housing for the filter for ready use in connection with photographic and like optical purposes.

4. The process of producing a filter stratum for use in connection with photographic purposes comprising the steps of placing a first glass disk in a mold-forming mount having an inner supporting surface for said first glass disk, applying a viscous filter layer to the upper surface of said first glass disk in a quantity in excess of that required for the final filter stratum, subjecting said layer on said first glass disk to vibrations to thereby free said layer from air bubbles, ripples and like irregularities and to thereby displace said layer beyond the upper surface of said first glass disk for contact with the adjacent inner supporting surface of the mount, then subjecting said layer to drying action, placing into said mount a second glass disk for contact with said dried layer to thereby sandwich said layer between both said glass disks, and finally applying sufficient heat and pressure through said glass disks to said layer, to thereby soften the latter and to displace same between said second glass disk and said inner mount surface, whereby said second glass disk is bonded through displaced excess layer to said adjacent inner mount surface, thereby finally reducing the thickness of said layer to the required filter stratum and forming a unitary assemblage in which said holder forms the mold, as well as the housing for the filter for ready use in connection with photographic and like optical purposes.

5. A method of forming an optical filter in a ring-shaped holder having a stepped inner surface; comprising depositing onto a step of said inner surface of said holder a first glass plate, thereby exposing the upper surface of the latter, applying viscous filter material to said upper surface in an amount sufficient to provide a filter excess material thereon, subjecting said filter material to vibrations thereby effecting a substantially even distribution of said filter material over said upper plate surface and simultaneously freeing said filter material from air bubbles, ripples and like irregularities, then placing a second glass plate providing sufficient clearance with respect to the inner surface of said holder onto said filter material and above said first glass plate, thereby sandwiching said filter material between said first and second glass plates, and finally applying sufficient heat and pressure through said glass plates to said filter material, whereby the latter is softened and due to application of said pressure said excess filter material is displaced into the clearance between said second glass plate and said inner holder surface, thereby forming an upper rim-like annular portion consisting of said excess filter material, which portion overlies said second glass plate and bonds said holder to said last mentioned glass plate, thereby resulting in a unitary assemblage in which said holder forms the mold, as well as the housing for the filter for ready use in connection with photographic and like optical purposes.

6. A method of forming an optical filter in a holder having a stepped inner surface; comprising depositing onto a step of said inner surface of said holder a first glass plate, thereby exposing the upper surface of the latter, applying viscous filter material to said upper surface in an amount sufficient to provide a filter excess material thereon, imparting motion to said viscous filter material relative to the upper surface of said first glass plate to thereby evenly distribute said material thereon, then placing a second glass plate providing sufficient clearance with respect to the inner surface of said holder onto said filter material and above said first glass plate, thereby sandwiching said filter material between said first and second glass plates, and finally applying sufficient heat and pressure through said glass plates to said filter material, whereby the latter is softened and due to application of said pressure said excess filter material is displaced into the clearance between said second glass plate and said inner holder surface, thereby forming an upper rim-like annular portion consisting of said excess filter material, which portion overlies said second glass plate and bonds said holder to said last mentioned glass plate, thereby resulting in a unitary assemblage in which said holder forms the mold, as well as the housing for the filter for ready use in connection with photographic and like optical purposes.

7. A method of forming an optical filter in a holder having a stepped inner surface; comprising depositing onto a step of said inner surface of said holder a first glass plate, thereby exposing the upper surface of the latter, applying viscous filter material to said upper surface in an amount corresponding to the final filter stratum, subjecting said filter material to vibrations thereby effecting a substantially even distribution of said filter material to thereby form said final filter stratum on said upper plate surface and to thereby simultaneously free said filter material from air bubbles, ripples and like irregularities, then adding to said final filter stratum a binder substance, placing a second glass plate providing sufficient clearance with respect to the inner surface of the holder onto said binder substance and above said first glass plate, thereby sandwiching said filter stratum and said binder substance between said first and second glass plates, applying pressure to said binder substance whereby the latter is reduced to a coating which is displaced into the clearance between said second glass plate and said inner holder surface thereby forming an upper rim-like annular portion consisting of binder substance whereby the second glass plate and holder are bonded together to form a unitary assemblage in which said holder forms the mold, as well as the housing for the filter for ready use in connection with photographic and like optical purposes.

8. A method of forming an optical filter in a holder having a stepped inner surface; comprising depositing onto a step of said inner surface of said holder a first glass plate, thereby exposing the upper surface of the latter, evenly distributing viscous filter material onto said upper surface and in an amount corresponding to the final filter stratum, then adding to said final filter stratum a binder substance, placing a second glass plate providing sufficient clearance with respect to the inner surface of the holder onto said binder substance and above said first glass plate, thereby sandwiching said filter stratum and said binder substance between said first and second glass plates, applying pressure to said binder substance whereby the latter is reduced to a coating which is displaced into the clearance between said second glass plate and said inner holder surface thereby forming an upper rim-like annular portion consisting of binder substance whereby the second glass plate and holder are bonded together to form a unitary assemblage in which said holder forms the mold, as well as the housing for the filter for ready use in connection with photographic and like optical purposes.

9. A filter for use in connection with photographic and like optical purposes; comprising a ring-shaped holder having an inner wall with a stepped surface, a first transparent disk having an upper surface and disposed in said holder and supported by one step of said surface, said inner wall of said holder being provided with an undercut recess constituting a further step at said inner surface, a viscous filter forming material disposed on said upper surface of said first disk and extending into said recess, a second transparent disk having a peripheral edge spaced a predetermined distance from said inner wall of said holder at said further step and located approximately at a level determined by said further step, thereby permitting said viscous material to be extended between the peripheral edge of said second disk and said further step adjacent said recess, whereby said holder is bonded with said second disk through said extended material.

10. A filter according to claim 9, a portion of said extended material being located above the peripheral edge of said second disk.

References Cited in the file of this patent
UNITED STATES PATENTS

| | | |
|---|---|---|
| 909,792 | Henderson | Jan. 12, 1909 |
| 1,646,568 | Willard | Oct. 25, 1927 |
| 1,826,945 | McKay et al. | Oct. 13, 1931 |
| 2,632,725 | Marks et al. | Mar. 24, 1953 |
| 2,719,328 | Patton et al. | Oct. 4, 1955 |